United States Patent
Hongthong et al.

(10) Patent No.: US 9,200,657 B2
(45) Date of Patent: Dec. 1, 2015

(54) SHEETROCK WALL ANCHOR

(71) Applicants: Thanomsak Hongthong, Middle Island, NY (US); Seng Hongthong, Brentwood, NY (US)

(72) Inventors: Thanomsak Hongthong, Middle Island, NY (US); Seng Hongthong, Brentwood, NY (US)

(73) Assignee: THANOMSAK HONGTHONG, Middle Island, NY (US)

( * ) Notice: Subject to any disclaimer, the term of this patent is extended or adjusted under 35 U.S.C. 154(b) by 0 days.

(21) Appl. No.: 14/228,768

(22) Filed: Mar. 28, 2014

(65) Prior Publication Data

US 2015/0275949 A1  Oct. 1, 2015

(51) Int. Cl.
*F16B 13/08* (2006.01)
*F16B 13/04* (2006.01)

(52) U.S. Cl.
CPC ............ *F16B 13/04* (2013.01); *F16B 13/0808* (2013.01)

(58) Field of Classification Search
CPC ...... F16B 13/04; F16B 13/08; F16B 13/0808; F16B 13/0833
USPC .................. 411/340–342, 344, 345, 347, 552
See application file for complete search history.

(56) References Cited

U.S. PATENT DOCUMENTS

| | | | |
|---|---|---|---|
| 1,805,319 A * | 5/1931 | Tomkinson | 411/346 |
| 2,887,002 A | 5/1959 | McAfee | |
| 2,897,694 A * | 8/1959 | Carney | 408/72 R |
| 3,974,735 A | 8/1976 | Berner | |
| 4,293,259 A * | 10/1981 | Liebig | 411/32 |
| 4,312,612 A | 1/1982 | Thompson | |
| 4,997,327 A * | 3/1991 | Cira | 411/340 |
| 5,209,621 A * | 5/1993 | Burbidge | 411/340 |
| 5,224,807 A * | 7/1993 | Belser | 411/342 |
| 5,288,162 A | 2/1994 | Bisping et al. | |
| 6,062,785 A * | 5/2000 | McDermott | 411/344 |
| 7,762,751 B2 | 7/2010 | Panasik et al. | |
| 8,057,147 B2 | 11/2011 | Ernst et al. | |
| 8,404,065 B2 | 3/2013 | Miller | |
| 8,544,228 B2 | 10/2013 | Bronner | |
| 8,555,596 B2 | 10/2013 | Hohmann, Jr. | |
| 8,925,172 B2 * | 1/2015 | English | 29/428 |
| 2004/0109741 A1 * | 6/2004 | Bavaro | 411/341 |
| 2008/0080949 A1 * | 4/2008 | Deng et al. | 411/342 |
| 2009/0103999 A1 * | 4/2009 | Fucito | 411/342 |
| 2012/0045292 A1 | 2/2012 | Kaye | |
| 2012/0257944 A1 | 10/2012 | McDuff et al. | |
| 2013/0039715 A1 | 2/2013 | Daykin et al. | |
| 2013/0074435 A1 | 3/2013 | Hohmann, Jr. | |
| 2014/0271031 A1 * | 9/2014 | Agri et al. | 411/344 |

* cited by examiner

*Primary Examiner* — Flemming Saether

(74) *Attorney, Agent, or Firm* — Henry M. Feiereisen LLC.

(57) ABSTRACT

A sheetrock wall anchor has a hollow body having an axis and a head on one end, and arms which are spaced from one another circumferentially and pivot to extend from one end to the opposite end of the body when inoperational, to extend in opposite direction for insertion of the anchor through a hole in a sheetrock wall, and to extend transversely to the body for abutting against a rear surface of the sheetrock wall, and a bush is placed on the body and push onto it by a threaded bolt with a nut.

3 Claims, 4 Drawing Sheets

SHEETROCK WALL ANCHOR

BACKGROUND OF THE INVENTION

The present invention relates to sheetrock wall anchors and to anchoring systems for sheetrock walls.

The sheetrock wall anchors and anchoring system are manufactured in great varieties and used widely in different industries. The sheetrock wall anchors usually have a portion which is to be anchored in a sheetrock wall and another portion on which an object is to be supported. Some of the sheetrock wall anchors are disclosed in U.S. Pat. Nos. 2,887,002; 3,974,735; 4,312,612; 5,288,162; 7,762,751; 8,057,147; 8,404,065; 8,544,228; 8,555,596; 20120045292; 20120257944; 20130039715; 20130074435.

It is believed that the existing sheetrock wall anchors and anchoring systems can be further improved.

SUMMARY OF THE INVENTION

Accordingly it is an object of the present invention to provide a sheetrock wall anchor and a sheetrock wall anchoring system, which is a further improvement of the existing sheetrock wall anchors and systems.

In keeping with these objects and with others which will become apparent hereinafter, one feature of the present invention resides briefly stated, in a sheetrock wall anchor which has a hollow elongated body having an axis and provided with a head on its one end, and a plurality of elongated arms which are spaced from one another in a circumferential direction and are each arranged pivotally relative to said body about an axis extending perpendicular to the axis of the body between a first position in which the arms extend along the body from its one end toward its another end for passing through a hole in a sheetrock wall, and a second position in which the arms extend transversely to the axis of the body when the anchor is moved through the hole in the sheetrock wall and the arms are located behind the sheetrock wall.

When the sheetrock wall anchor is designed in accordance with the present invention, it provides simple and reliable anchoring in the sheetrock wall and support of objects thereon.

The sheetrock wall anchor of the invention can be provided with a ring located on the body under the head and supporting the arms pivotally relative to the head of the anchor.

The sheetrock wall anchor of the invention can be provided with springs each located between the body and a respective one of the arms and having a loop surrounding the ring and two opposite end portions abutting against the body and the respective one of the arms correspondingly.

In the sheetrock wall anchor of the invention the opposite spring portions can be engaged in a grove provided on the body and in a groove provided on a respective one of the arms.

The sheetrock anchoring system can further include a bush fittable onto the body and insertable into the hole of the sheetrock wall, and a threaded bolt screwable into the body and having a nut movable on the bolt and pushing the bush onto the body of the anchor.

The new features of the present invention are set forth in particular in the appended claims.

The invention itself, however, both as to its construction and its manner of operation, will be best understood from the following description of the preferred embodiments which is accompanied by the following drawings.

DESCRIPTION OF THE PREFERRED EMBODIMENTS

Figure 1:
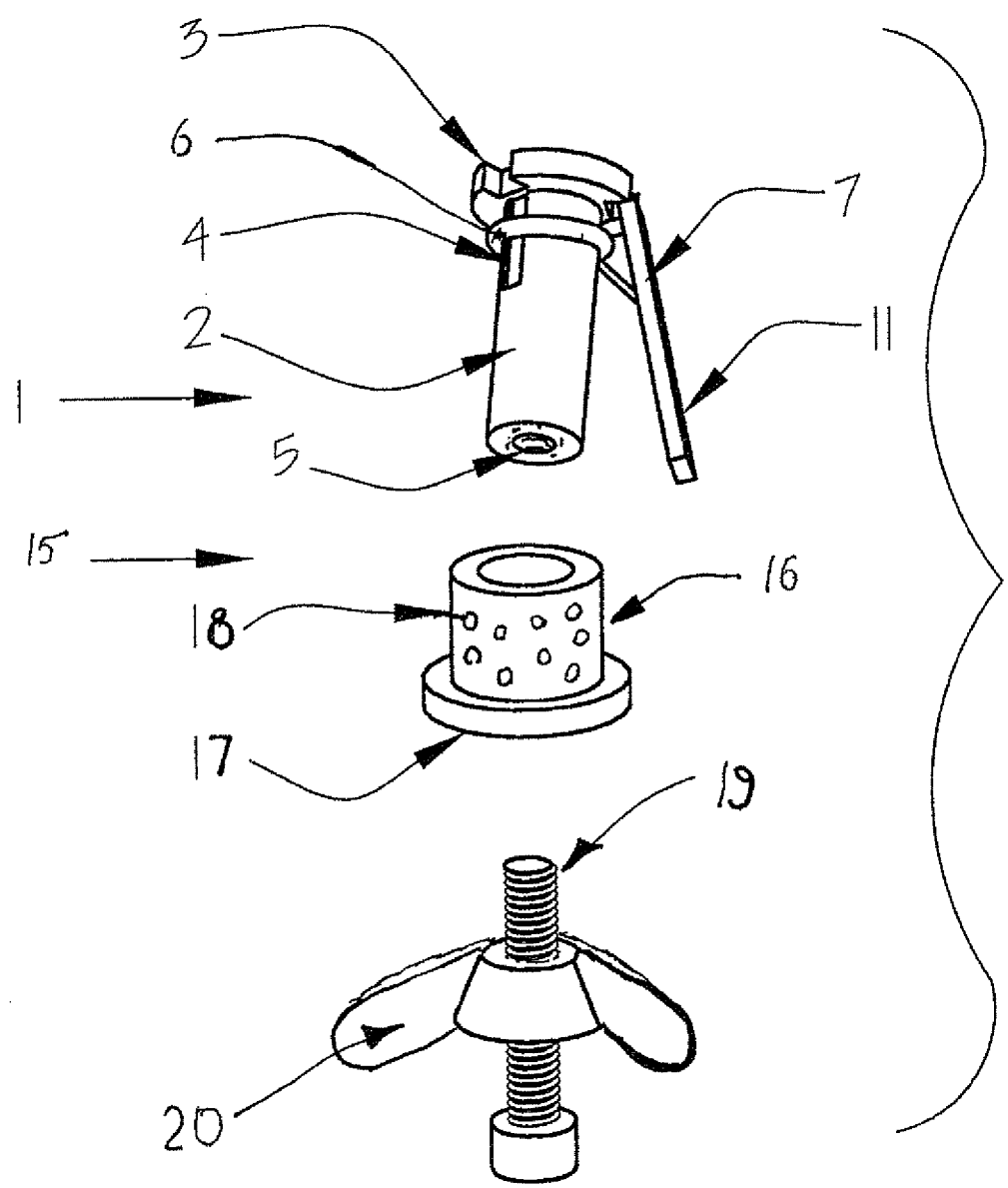
FIG. 1 is an exploded with showing a sheetrock wall anchor and other components of a sheetrock wall anchoring system.
Figure 2:
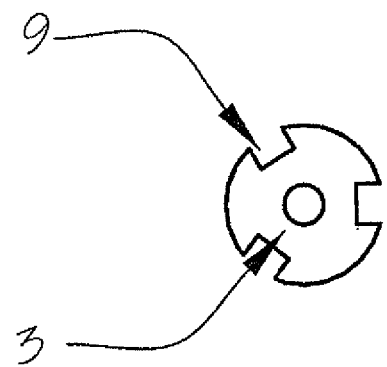
FIG. 2 is a plan view of a head of an elongated body of the inventive sheetrock wall anchor.
Figure 3:
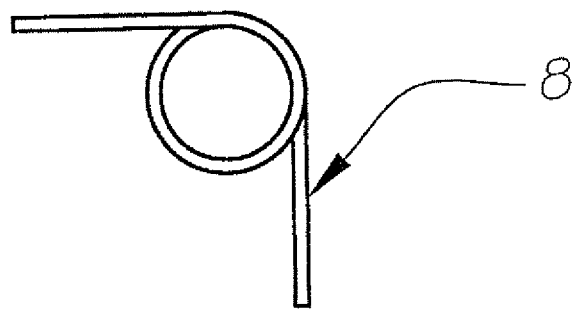
FIG. 3 is a view showing a spring used to interact with the body and with arms of the inventive sheetrock anchor.
Figure 4:
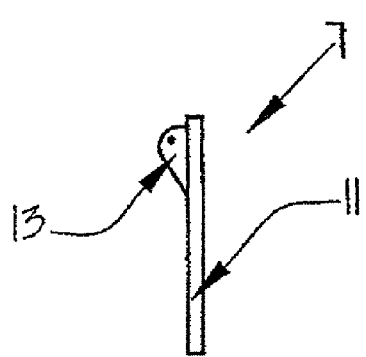
FIGS. 4 and 5 are a side view and a front view of one of the arms of the inventive sheetrock wall anchor.
Figure 5:
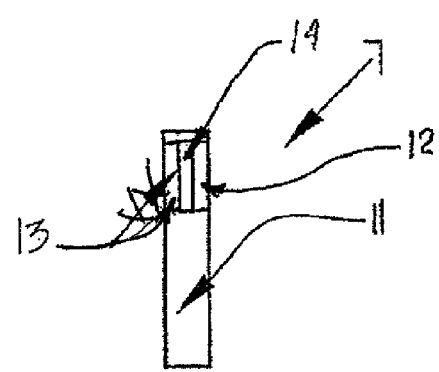

A sheetrock wall anchor according to the present invention is identified with reference numeral 1 and has a hollow elongated body 2 having an axis and provided with a head 3 having grooves 9. The body 2 has several grooves 4 spaced from one another in a circumferential direction and a threaded opening 5. A ring 6 is arranged on an upper part of the body 2.

A plurality of arms 7 are spaced from one another in a circumferential direction. They are arranged pivotally about their axes which extend transversely to the axis of the body 2. For this purpose each arm 7 has elongated strip 11 with two projections 12 and 13 each having an eye with which it is pivotally supported on the ring 6.

The sheetrock wall anchor further has a plurality of springs 8 each having a loop which surrounds the body 2 and with which each spring is supported on the ring 6 and two legs with one leg engaging in one groove 4 of the body 2 and another leg engaging in a groove 14 of each arm 7, located between the projections 12 and 13.

The sheetrock wall anchoring system further has a bush 15, preferably composed of plastic and having a body 16 and a flange 17. The body 16 is provided with outer roughening which can be formed by a plurality of projections 18 for engaging with a sheetrock wall. The system further has a threaded bolt 19 and a nut 20, preferably a wing nut.

The sheetrock wall anchor in accordance with the present invention is used in the following manner.

Figure 6:
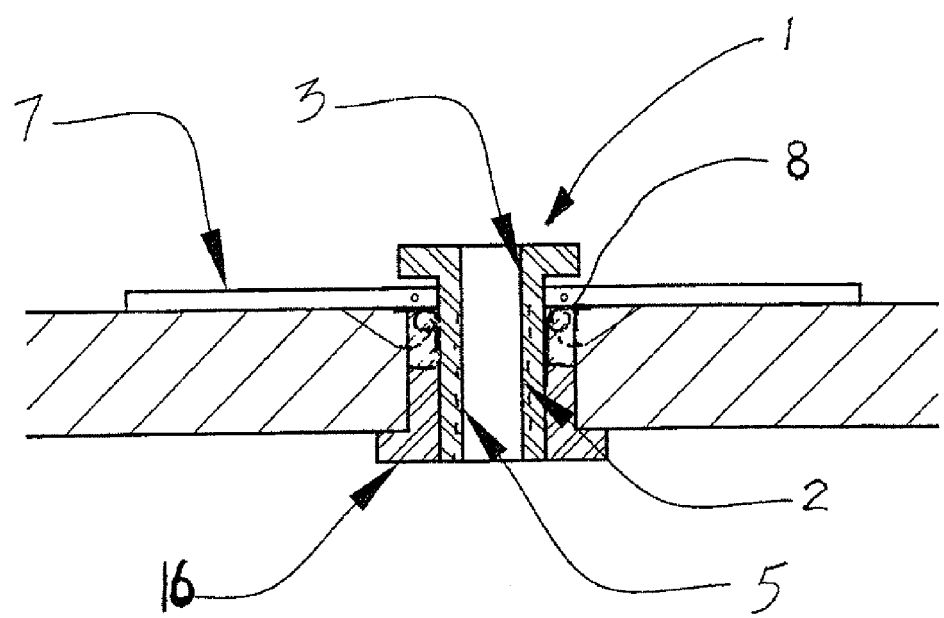
FIG. 6 is a view showing the inventive sheetrock anchor mounted in a sheetrock wall.

In the initial position the arms 7 extend along the body 2 from its upper end toward its lower end and the upper ends of the arms 7 are engaged in the grooves 9 of the head 3. A hole is made in a sheetrock wall, and the anchor is passed through the hole. During passing through the hole the springs 8 are compressed between the body 2 and the arms 7, and when the arms pass behind the wall the springs 8 pivot the arms 7 to a transverse position as shown in FIG. 6. The bush 15 is fitted on a lower end of the body 2, the bolt 19 is screwed into the body 2 and the nut 20 is turned by a user over the bolt to push the bush 15 completely over the body 2 and to press the spread arms 7 to the back surface of the sheetrock wall. The anchor is anchored in the sheetrock wall. The bolt 19 can stay in the body 2 and support an object, or can be removed from the body 2 and another bolt can be screwed into the body to support an object.

The present invention is not limited to the details shown since various modifications and structural changes are possible without departing from the spirit of the invention.

What is desired to be protected by Letters Patent is set forth in particular in the appended claims.

The invention claimed is:

1. A sheetrock wall anchor comprising:
a hollow elongated body having an axis and a head on its one end;
a plurality of arms spaced from one another in a circumferential direction and pivotable relative to the body around an axis extending perpendicular to the body between a first inoperative position in which the arms extend from the one end to an opposite end of the body, and a second position in which the arms extend transversely to the body to abut against a back surface of the sheetrock wall;

a ring surrounding the one end of the body under the head and supporting the arms pivotally between the first and second positions; and a plurality of springs located between the body and the arms and supported on the ring arranged on the body, wherein each of the springs has a loop supported on the ring and two portions engaging in a groove of the body and a groove of the arm.

2. The sheetrock wall anchor of claim 1, wherein the head has a plurality of grooves spaced from one another in the circumferential direction and constructed to receive portions of the arms in the first position.

3. A system for anchoring in a sheetrock wall, comprising the sheetrock wall anchor as defined in claim 1, a bush placeable on the body of the sheetrock wall anchor and in a hole of a sheetrock wall, and a bolt screwable into the body and having a nut for moving the bush onto the body and tightening the anchor on the sheetrock wall.

\* \* \* \* \*